United States Patent
Gill et al.

(10) Patent No.: US 6,594,123 B1
(45) Date of Patent: Jul. 15, 2003

(54) AP PINNED SPIN VALVE READ HEAD WITH A NEGATIVE FERROMAGNETIC FIELD BIASED FOR ZERO ASYMMETRY

(75) Inventors: Hardayal Singh Gill, Portala Valley, CA (US); Mustafa Pinarbasi, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/500,122

(22) Filed: Feb. 8, 2000

(51) Int. Cl.⁷ ............................................. G11B 5/39
(52) U.S. Cl. ........................................... 360/324.12
(58) Field of Search ....................... 360/321.1–324.12

(56) References Cited

U.S. PATENT DOCUMENTS

| | | | |
|---|---|---|---|
| 5,768,071 A | 6/1998 | Lin | 360/113 |
| 5,784,225 A | 7/1998 | Saito et al. | 360/113 |
| 5,796,561 A * | 8/1998 | Mauri | 360/324.11 |
| 5,828,529 A | 10/1998 | Gill | 360/113 |
| 5,869,963 A | 2/1999 | Saito et al. | 324/252 |
| 5,910,344 A | 6/1999 | Hasegawa et al. | 427/599 |
| 6,219,209 B1 * | 4/2001 | Gill | 360/324.11 |
| 6,243,241 B1 * | 6/2001 | Kanai | 360/324.11 |
| 6,313,973 B1 * | 11/2001 | Fuke | 360/324.1 |
| 6,411,477 B1 * | 6/2002 | Gill | 361/324.12 |
| 6,414,826 B1 * | 7/2002 | Gill | 360/324.12 |
| 6,480,365 B1 * | 11/2002 | Gill et al. | 360/324.11 |

* cited by examiner

Primary Examiner—A. J. Heinz
(74) Attorney, Agent, or Firm—Ervin F. Johnston (57) ABSTRACT

A spin valve sensor of a read head has a platinum manganese (PtMn) pinning layer that pins a magnetic moment of an antiparallel (AP) pinned layer structure. The pinned layer structure has a first AP pinned layer exchange coupled to the pinning layer so that the magnetic moment of the first AP pinned layer is pinned in a first direction and has a second AP pinned layer that has a magnetic moment pinned in a second direction antiparallel to the first direction. A free layer structure of the spin valve sensor is located asymmetrically between first and second shield layers so that when a sense current is conducted through the sensor a net image current field is executed on the free layer structure by the shield layers. For example, if the second AP pinned layer is thicker than the first AP pinned layer $H_I = H_{FC} + H_D + H_{IM}$ is exerted on the free layer structure where $H_I$ is a sense current field from all conductive layers other than the free layer structure, $H_{FC}$ is a negative ferromagnetic coupling field from the second AP pinned layer, $H_D$ is a net demagnetization field from the AP pinned layer structure and $H_{IM}$ is a net image current field from the shield layers.

17 Claims, 10 Drawing Sheets

FIG. 11
(ABS)

AP PINNED SPIN VALVE READ HEAD WITH A NEGATIVE FERROMAGNETIC FIELD BIASED FOR ZERO ASYMMETRY

BACKGROUND OF THE INVENTION

1. Field of the Invention

The present invention relates to an antiparallel (AP) pinned spin valve read head biased for zero asymmetry and, more particularly, to such a head wherein the magnetic fields acting on a free layer structure in a spin valve sensor can be balanced so that a magnetic moment of the free layer structure is positioned for playback symmetry.

2. Description of the Related Art

The heart of a computer is an assembly that is referred to as a magnetic disk drive. The magnetic disk drive includes a rotating magnetic disk, a slider that has read and write heads, a suspension arm above the rotating disk and an actuator that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a spin valve sensor for sensing the magnetic signal fields from the rotating magnetic disk. The sensor includes a nonmagnetic electrically conductive spacer layer sandwiched between a ferromagnetic pinning layer and a ferromagnetic free layer. An antiferromagnetic pinning layer interfaces the pinned layer for pinning the magnetic moment of the pinned layer 90° to an air bearing surface (ABS) wherein the ABS is an exposed surface of the sensor that faces the rotating disk. First and second leads are connected to the spin valve sensor for conducting a sense current therethrough. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is preferably parallel to the ABS, is when the sense current is conducted through the sensor without magnetic field signals from the rotating magnetic disk. If the quiescent position of the magnetic moment is not parallel to the ABS the positive and negative responses of the free layer will not be equal which results in read signal asymmetry which is discussed in more detail hereinbelow.

The thickness of the spacer layer is chosen so that shunting of the sense current and a magnetic coupling between the free and pinned layers are minimized. This thickness is typically less than the mean free path of electrons conducted through the sensor. With this arrangement, a portion of the conduction electrons is scattered by the interfaces of the spacer layer with the pinned and free layers. When the magnetic moments of the pinned and free layers are parallel with respect to one another scattering is minimal and when their magnetic moments are antiparallel scattering is maximized. An increase in scattering of conduction electrons increases the resistance of the spin valve sensor and a decrease in scattering of the conduction electrons decreases the resistance of the spin valve sensor. Changes in resistance of the spin valve sensor is a function of $\cos \theta$, where $\theta$ is the angle between the magnetic moments of the pinned and free layers. When a sense current is conducted through the spin valve sensor, resistance changes cause potential changes that are detected and processed as playback signals from the rotating magnetic disk. The sensitivity of the spin valve sensor is quantified as magnetoresistance or magnetoresistive coefficient dr/R where dr is the change in resistance of the spin valve sensor from minimum resistance (magnetic moments of free and pinned layers parallel) to maximum resistance (magnetic moments of the free and pinned layers antiparallel) and R is the resistance of the spin valve sensor at minimum resistance. Because of the high magnetoresistance of a spin valve sensor it is sometimes referred to as a giant magnetoresistive (GMR) sensor.

An improved spin valve sensor, which is referred to hereinafter as antiparallel pinned (AP) spin valve sensor, is described in commonly assigned U.S. Pat. No. 5,465,185 to Heim and Parkin which is incorporated by reference herein. The AP spin valve differs from the spin valve described above in that the pinned layer comprises multiple thin films, hereinafter referred to as AP pinned layer. The AP pinned layer has a nonmagnetic spacer film which is sandwiched between first and second ferromagnetic thin films. The first thin film, which may comprise several thin films, is immediately adjacent to the antiferromagnetic layer and is exchange-coupled thereto, with its magnetic moment directed in a first direction. The second thin film is immediately adjacent to the free layer and is coupled to the first thin film by the minimal thickness (in the order of 8 Å) of the spacer film between the first and second thin films. The magnetic moment of the second thin film is oriented in a second direction that is antiparallel to the direction of the magnetic moment of the first film. The magnetic moments of the first and second films subtractively combine to provide a net moment of the AP pinned layer. The direction of the net moment is determined by the thicker of the first and second thin films. The thicknesses of the first and second thin films are chosen so that the net moment is small. A small net moment equates to a small demagnetization (demag) field from the AP pinned layer. Since the antiferromagnetic exchange coupling is inversely proportional to the net moment, this results in a large exchange coupling.

A large exchange coupling between the pinning and AP pinned layers promotes higher thermal stability of the head. When the head encounters high heat conditions due to electrostatic discharge from an object, or due to contacting an asperity on the magnetic disk, a critical high temperature of the antiferromagnetic layer, hereinafter referred to as blocking temperature, can be exceeded, causing the magnetic spins of the pinning layer to be free to rotate in response to a magnetic field. The magnetic moment of the AP pinned layer is then no longer pinned in the desired direction. Such a condition is a result of low thermal stability. Significant advantages of the AP pinned spin valve over the typical single film pinned layer are a greater exchange coupling field and a lower demag field, which enhance thermal stability of the spin valve sensor.

As stated hereinabove, the AP pinned layer structure of the spin valve sensor imposes less demagnetization field $H_D$ on the free layer structure. This is important because a demagnetization field from a pinned layer structure, whether it be a simple single pinned layer or an AP pinned layer structure, is not uniform between the ends of the pinned layer structure that are perpendicular to the ABS. The demagnetization field is strongest at the ends and decays toward the middle of the sensor due to the first and second shield layers. This causes a nonuniform biasing of the free layer structure that impacts the sensitivity of the read head. Further, the demagnetization field $H_D$ is a function of the stripe height of the sensor wherein the stripe height is the distance between the ABS and an opposite recessed end of the sensor in the read head. The reason for this variation is because of the difficulty in controlling the lapping of various rows of magnetic head assemblies to establish their stripe heights. Unfortunately, there is a sigma (distribution of stripe heights) from row to row and between the magnetic head assemblies from row to row. Accordingly, magnetic heads from one row of magnetic heads may have positive readback asymmetry while magnetic heads from another row of magnetic heads may have a negative readback asymmetry. Since the demagnetization field from the AP pinned layer structure is significantly less than that from a simple pinned layer the aforementioned sigma and degree of nonuniform demagnetization field $H_D$ acting on the free layer structure is minimized.

The transfer curve for a spin valve sensor is defined by the aforementioned cos θ where θ is the angle between the directions of the magnetic nioments of the free and pinned layers. In a spin valve sensor subjected to positive and negative magnetic signal fields from a moving magnetic disk, which are typically chosen to be equal in magnitude, it is desirable that positive and negative changes in the resistance of the spin valve read head above and below a bias point on the transfer curve of the sensor be equal so that the positive and negative readback signals are equal. When the direction of the magnetic moment of the free layer is substantially parallel to the ABS and the direction of the magnetic moment of the pinned layer is perpendicular to the ABS in a quiescent state (no signal from the magnetic disk) the positive and negative readback signals should be equal when sensing positive and negative fields that are equal from the magnetic disk. Accordingly, the bias point should be located midway between the top and bottom of the transfer curve. When the bias point is located below the midway point the spin valve sensor is negatively biased and has positive asymmetry and when the bias point is above the midway point the spin valve sensor is positively biased and has negative asymmetry. The designer strives to improve asymmetry of the readback signals as much as practical with the goal being symmetry. When the readback signals are asymmetrical, signal output and dynamic range of the sensor are reduced.

Readback asymmetry is defined as $$\frac{V_1 - V_2}{\max (V_1 \text{ or } V_2)}$$

For example, +10% readback asymmetry means that the positive readback signal $V_1$ is 10% greater than it should be to obtain readback symmetry. 10% readback asymmetry is acceptable in many applications. +10% readback asymmetry may not be acceptable in applications where the applied field magnetizes the free layer close to saturation.. In these applications +10% readback asymmetry .can saturate the free layer in the positive direction and will, of course, reduce the negative readback signal by 10%. An even more subtle problem is that readback asymmetry impacts the magnetic stability of the free layer. Magnetic instability of the free layer means that the applied signal has disturbed the arrangement or multiplied one or more magnetic domains of the free layer. This instability changes the magnetic properties of the free layer which, in turn, changes the readback signal. The magnetic instability of the free layer can be expressed as a percentage increase or decrease in instability of the free layer depending upon the percentage of the increase or decrease of the asymmetry of the readback signal. Standard deviation of the magnetic instability can be calculated from magnetic instability variations corresponding to multiple tests of the free layer at a given readback asymmetry. There is approximately a 0.2% decrease in standard deviation of the magnetic instability of the free layer for a 1% decrease in readback asymmetry. This relationship is substantially linear which will result in a 2.0% reduction in the standard deviation when the readback asymmetry is reduced from +10% to zero. Magnetic instability of the free layer is greater when the readback asymmetry is positive. Accordingly, the magnetic instability of the free layer is greater when the readback asymmetry is positive than when the readback asymmetry is negative.

When the sense current $I_S$ is applied to the spin valve sensor there is an image sense current in each of the first and second shield layers. The image sense current in each shield layer causes each shield layer to produce an image sense current field $H_{IM}$ which traverses the free layer in a direction that is substantially perpendicular to the ABS. When the free layer of the AP pinned spin valve is symmetrically located midway between the first and second shield layers the image sense current fields counterbalance each other so that the net image sense current field on the free layer is zero. By asymmetrically locating the free layer between the first and second shield layers a net image sense current field can be employed for counterbalancing the other magnetic fields on the free layer. This is accomplished by sizing the first and second gap layers that separate the free layer from the first and second shield layers respectively so that the free layer is closer to a selected one of the shield layers. It is preferred that the second gap be thinner than the first gap so that the free layer is closer to the second shield layer. When these thicknesses are carefully selected readback asymmetry can be improved so that magnetic stability of the free layer is optimized.

The location of the transfer curve relative to the bias point is influenced by four major forces on the free layer of a spin valve sensor, namely a ferromagnetic coupling field $H_{FC}$ between the pinned layer and the free layer, a net demag field $H_D$ from the pinned layer, a sense current field $H_I$ from all conductive layers of the spin valve except the free layer and a net image current field $H_{IM}$ from the first and second shield layers. There is a need to deal with these forces on the free layer so as to improve asymmetry of the readback signals.

SUMMARY OF THE INVENTION

In the present invention the pinning layer results in the second AP pinned layer exerting a negative ferromagnetic field $-H_{FC}$ on the free layer structure. This means that the net demagnetization field $H_D$ from the AP pinned layer structure on the free layer structure is in the same direction as the ferromagnetic field $-H_{FC}$ on the free layer structure. Proper biasing of the free layer structure is accomplished by sizing the thicknesses of the layers of the spin valve sensor and the first and second gap layers (G1 and G2) and orienting the direction of the sense current $I_S$ in a predetermined direction through the spin valve sensor so that the sense current field $H_I$ is equal to the demagnetization field $H_D$ plus the negative ferromagnetic coupling field $H_{FC}$ plus the image current field $H_{IM}$. Accordingly, $H_I = H_D + H_{FC} + H_{IM}$. The sense current $I_S$ is oriented in such a direction that a sense current field from the free layer structure is opposite to a net demagnetization field $H_D$ from the AP pinned layer structure and one of the first and second read gaps is greater than the other of the first and second read gaps. In a bottom spin valve where the pinning layer is between the free layer structure and the first gap layer (G1) the first read gap is made thicker than the second read gap. With this arrangement the second shield layer is controlling for exerting a net image current field on the free layer structure which is in the same direction as the net demagnetization field $H_D$ and the negative ferromagnetic coupling field $-H_{FC}$.

An object of the present invention is to properly bias a free layer structure in an AP pinned spin valve sensor where a negative ferromagnetic coupling field $-H_{FC}$ acts on the free layer structure.

Another object is to provide a read head wherein a sense current field $H_I$ acting on a free layer structure of a spin valve sensor of the read head is opposed by a demagnetization field $H_D$, a ferromagnetic coupling field $H_{FC}$ and an imaging field $H_{IM}$ acting on the free layer structure.

Other objects and advantages of the invention will become apparent upon reading the following description taken together with the accompanying drawings.

DETAILED DESCRIPTION OF THE PREFERRED EMBODIMENTS

Magnetic Disk Drive

Figure 1:
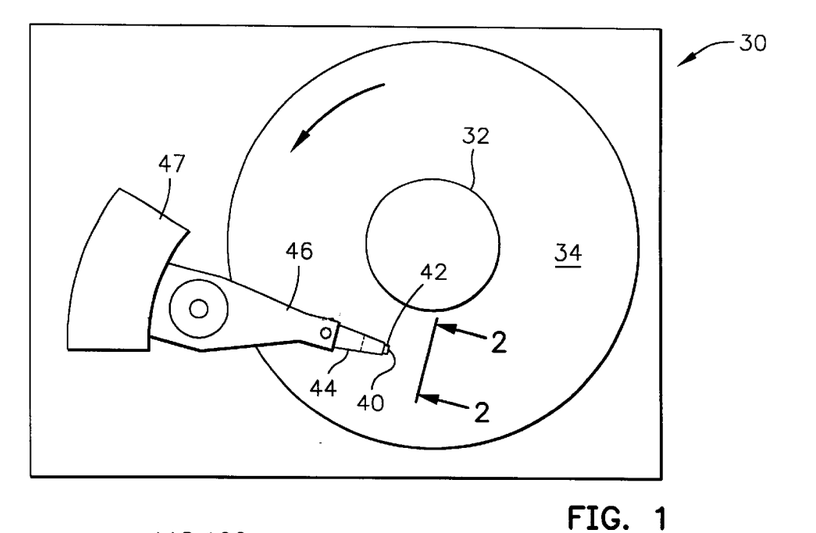
FIG. 1 is a plan view of an exemplary magnetic disk drive.
Figure 2:
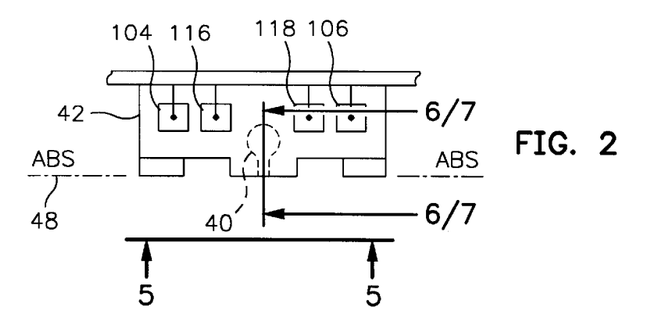
FIG. 2 is an end view of a slider with a magnetic head of the disk drive as seen in plane 2—2 of FIG. 1.
Figure 3:
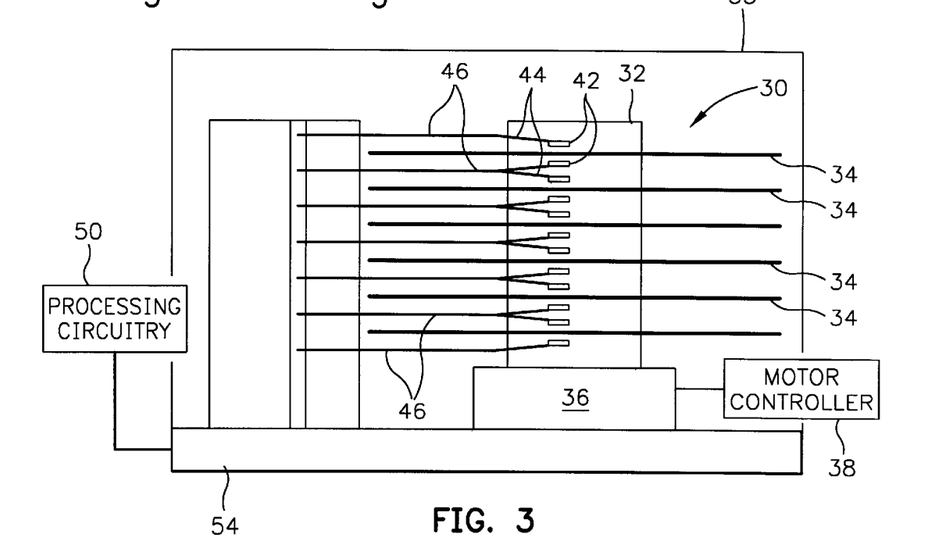
FIG. 3 is an elevation view of the magnetic disk drive wherein multiple disks and magnetic heads are employed.
Figure 4:
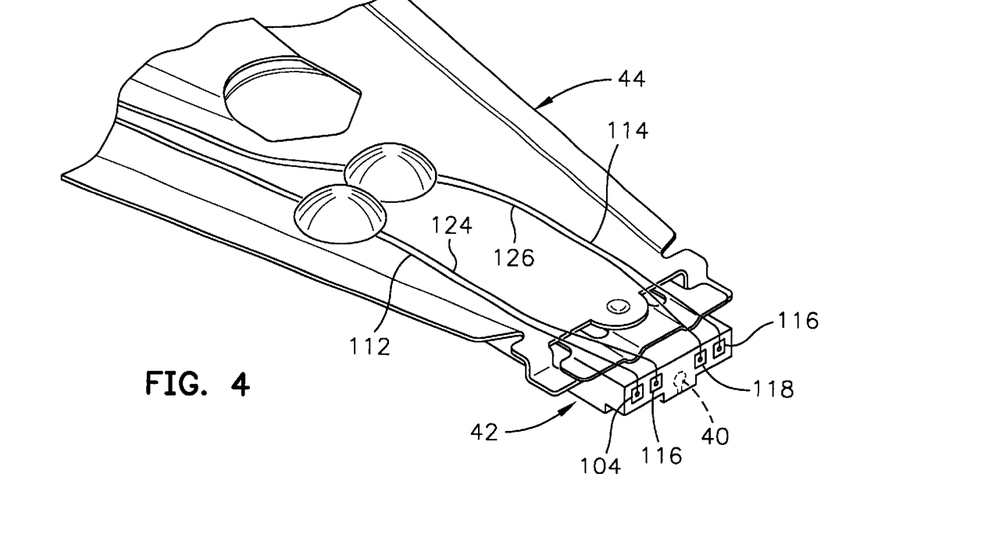
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
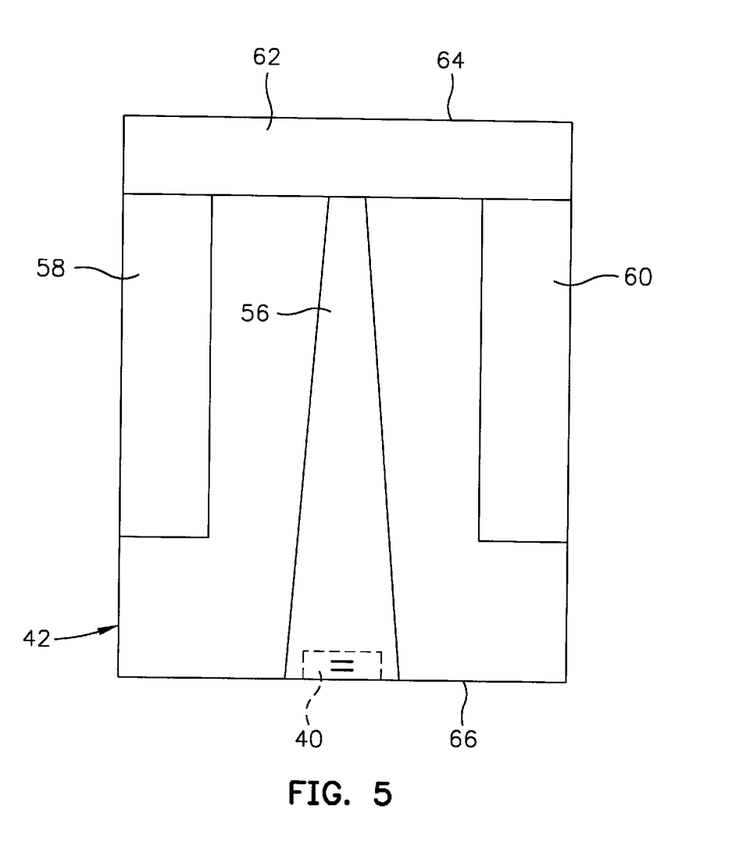
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
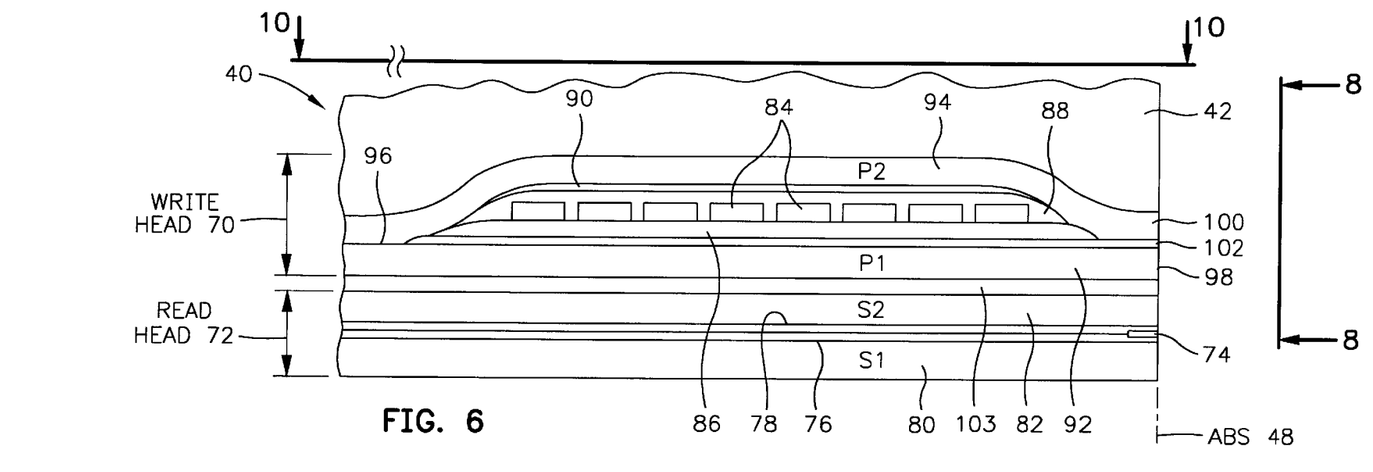
FIG. 6 is a partial view of the slider and a piggyback magnetic head as seen in plane 6—6 of FIG. 2.
Figure 8:
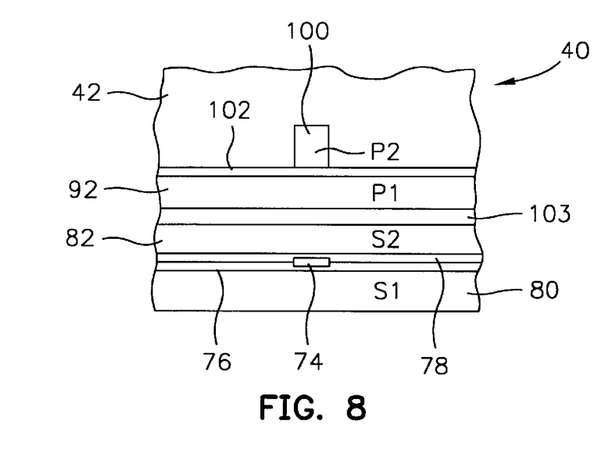
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

Figure 10:
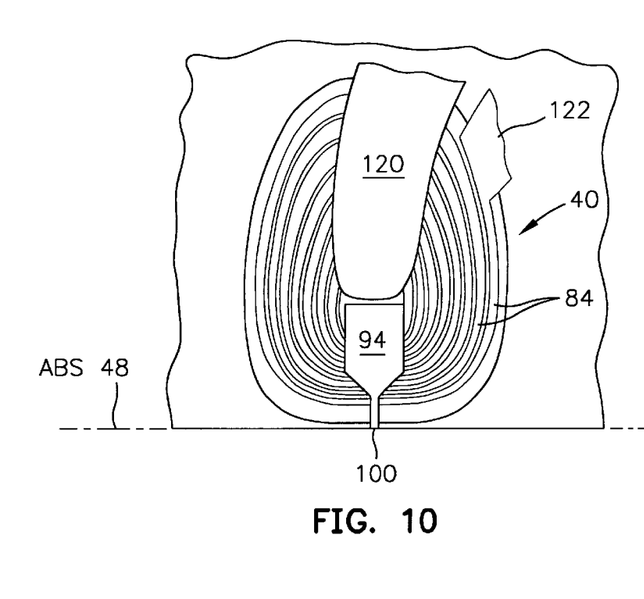
FIG. 10 is a view taken along plane 10—10 of FIG. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 7:
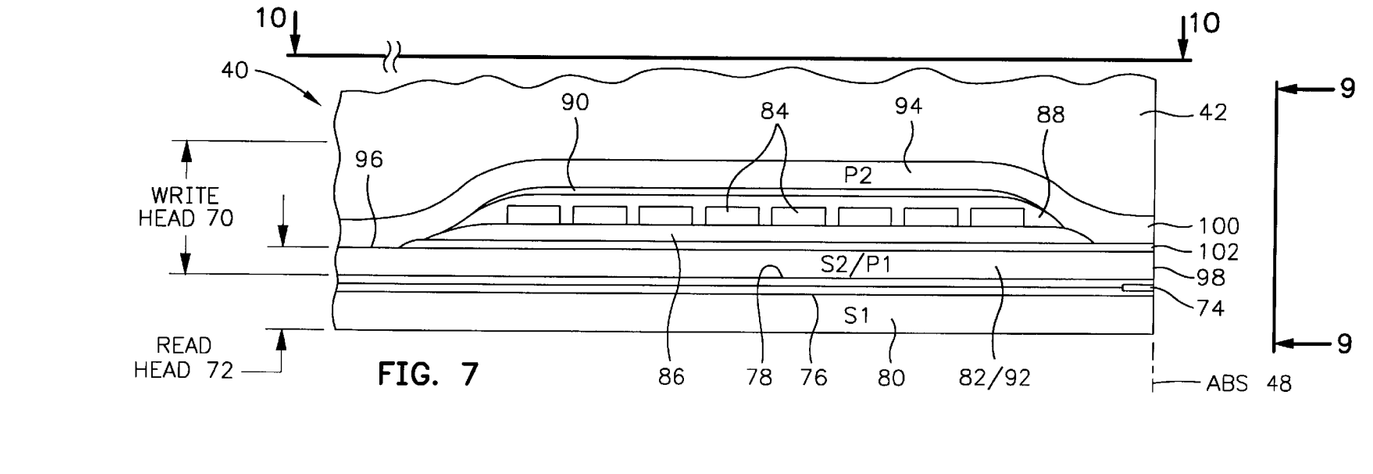
FIG. 7 is a partial view of the slider and a merged magnetic head as seen in plane 7—7 of FIG. 2.
Figure 9:
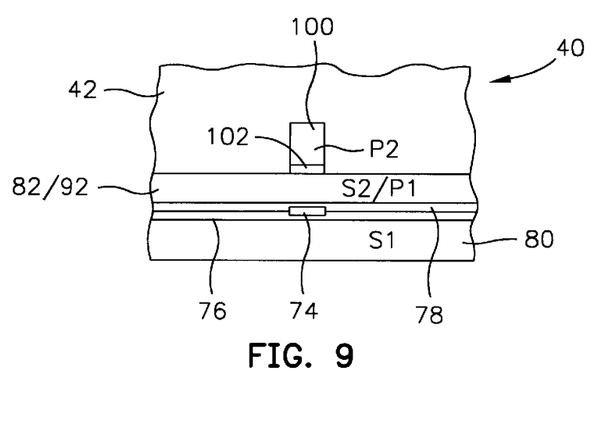
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
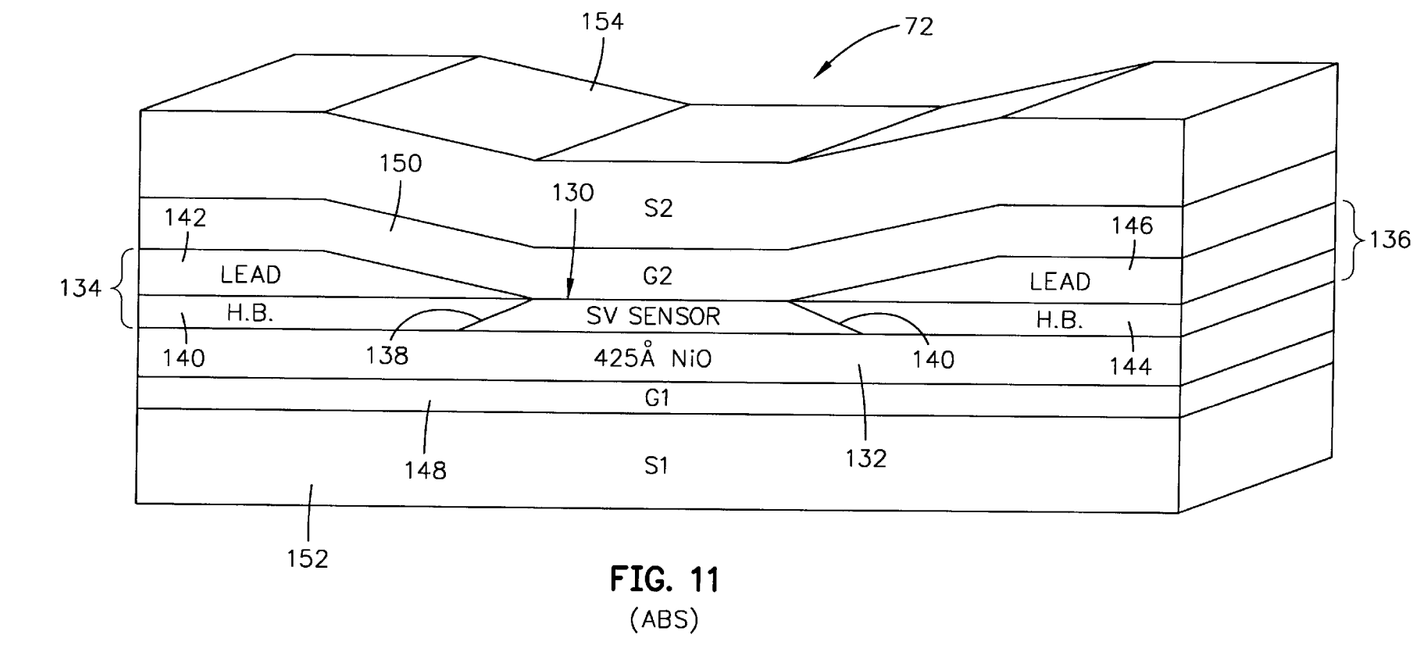
FIG. 11 is an isometric ABS illustration of a read head which employs an AP pinned spin valve (SV) sensor.

FIG. 11 is an isometric ABS illustration of the read head 72 shown in FIG. 6 or 8. The read head 72 includes the present spin valve sensor 130 which is located on an antiferromagnetic (AFM) pinning layer 132. A ferromagnetic pinned layer in the spin valve sensor 130, which is to be described hereinafter, is pinned by the magnetic spins of the pinning layer 132. The AFM pinning layer is typically 425 Å of nickel oxide (NiO). First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 130 for stabilizing the magnetic domains therein. The AFM pinning layer 132, the spin valve sensor 130 and the first and second hard bias and lead layers 134 and 136 are located between nonmagnetic electrically insulative first and second read gap layers 148 and 150. The first and second read gap layers 148 and 150 are, in turn, located between ferromagnetic first and second shield layers 152 and 154.

Figure 12:
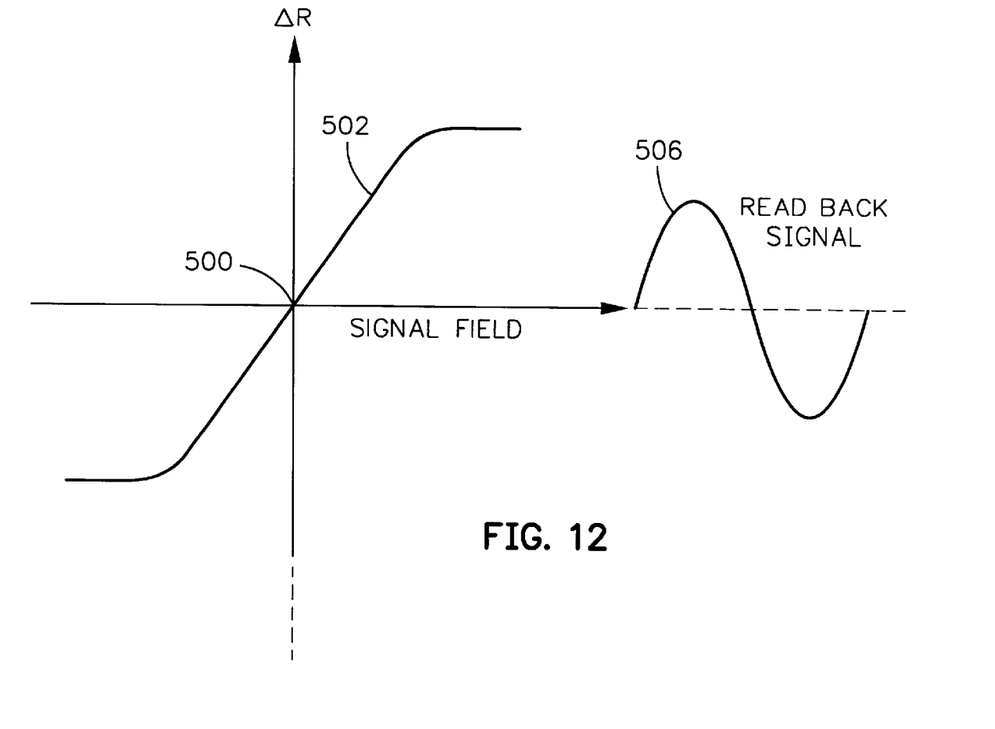
FIG. 12 shows an exemplary transfer curve of a read head with readback signal symmetry.
Figure 13:
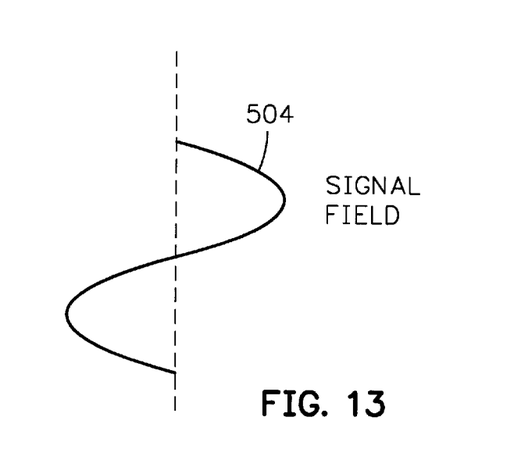
FIG. 13 is a signal field applied to the read head by a rotating magnetic disk.

FIGS. 12 and 13 show graphs for a properly biased free layer structure of a spin valve sensor. In FIG. 12 a zero bias point 500 is shown midway on a transfer curve 502 of the spin valve sensor. In response to signal fields 504 from a rotating magnetic disk the readback signals 506 are symmetrical. When the signal field 504 increases the resistance of the spin valve sensor the read head produces a positive readback signal and when the signal field 504 decreases the resistance of the spin valve sensor the read head produces a negative readback signal. When the bias point 500 is lowered on the transfer curve 502 the read head is said to have p positive asymmetry because the positive portion of the readback signal 506 is greater than the negative portion and when the bias point 500 is moved upwardly on the transfer curve 502 the read head has negative asymmetry because the negative portion of the readback signal 506 is greater than the positive portion thereof.

Figure 14:
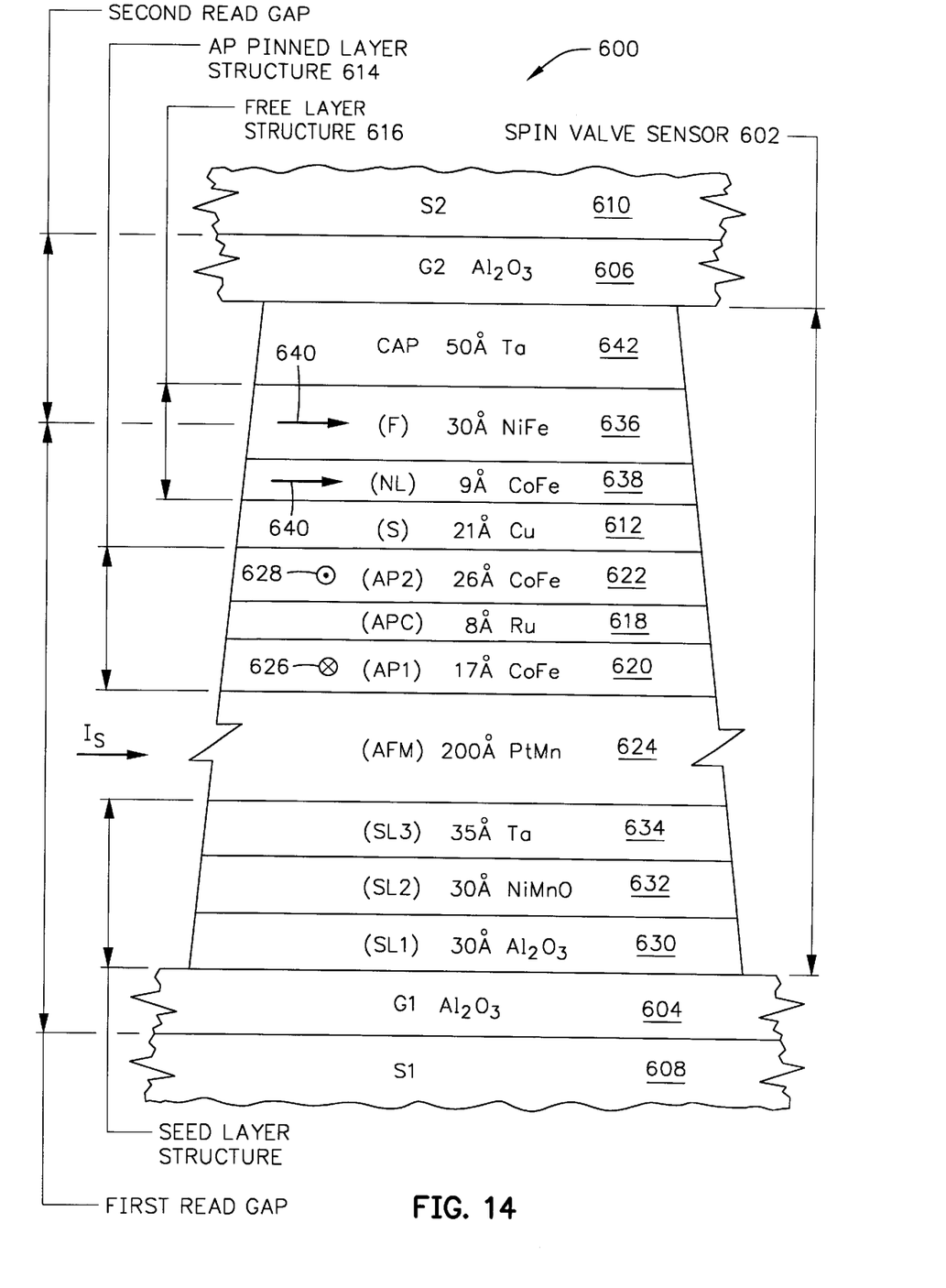
FIG. 14 is an ABS illustration of an embodiment of the present invention.
Figure 15:
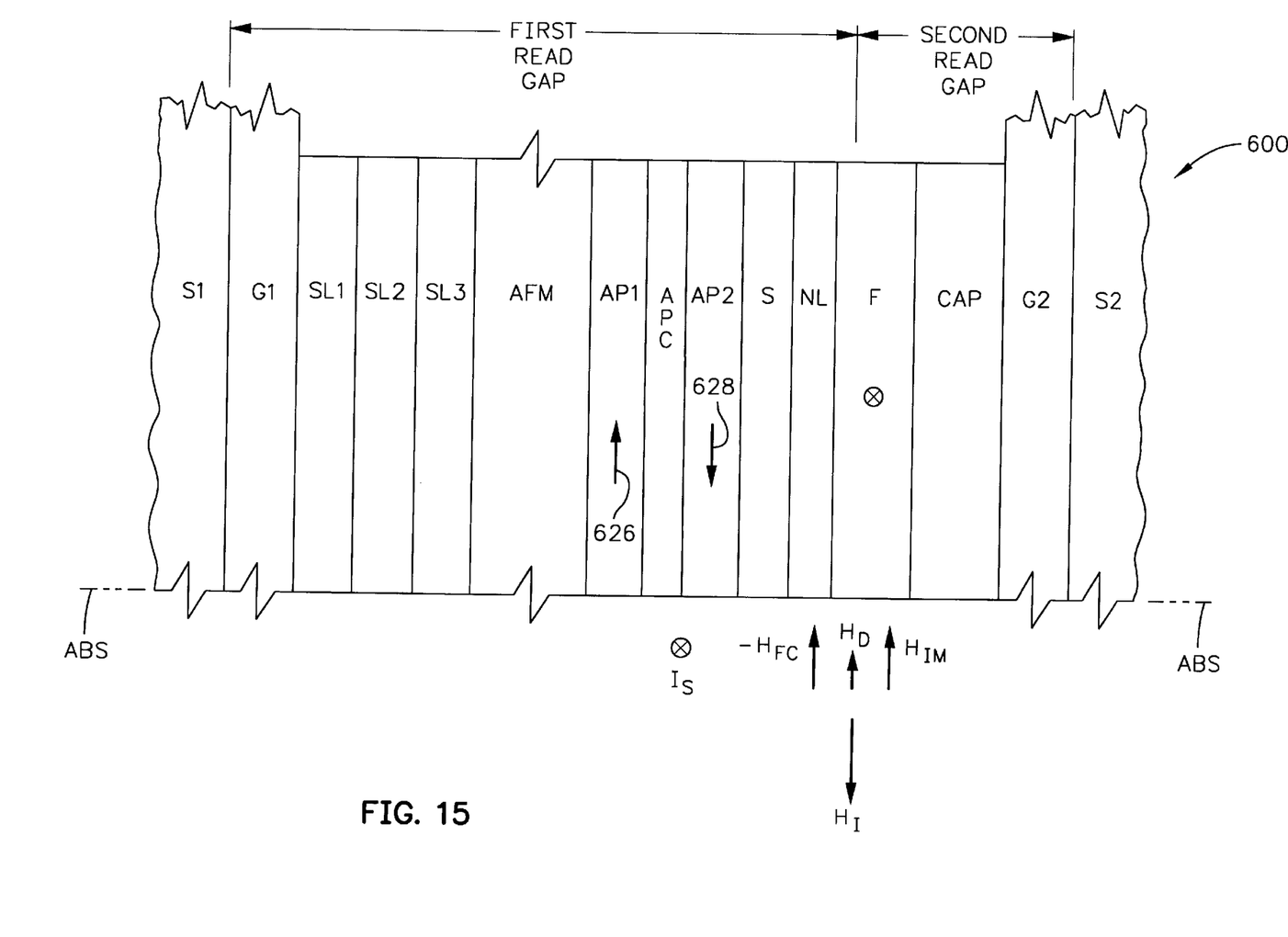
FIG. 15 is a view from the left side of FIG. 14 after rotating 90°.
Figure 17:
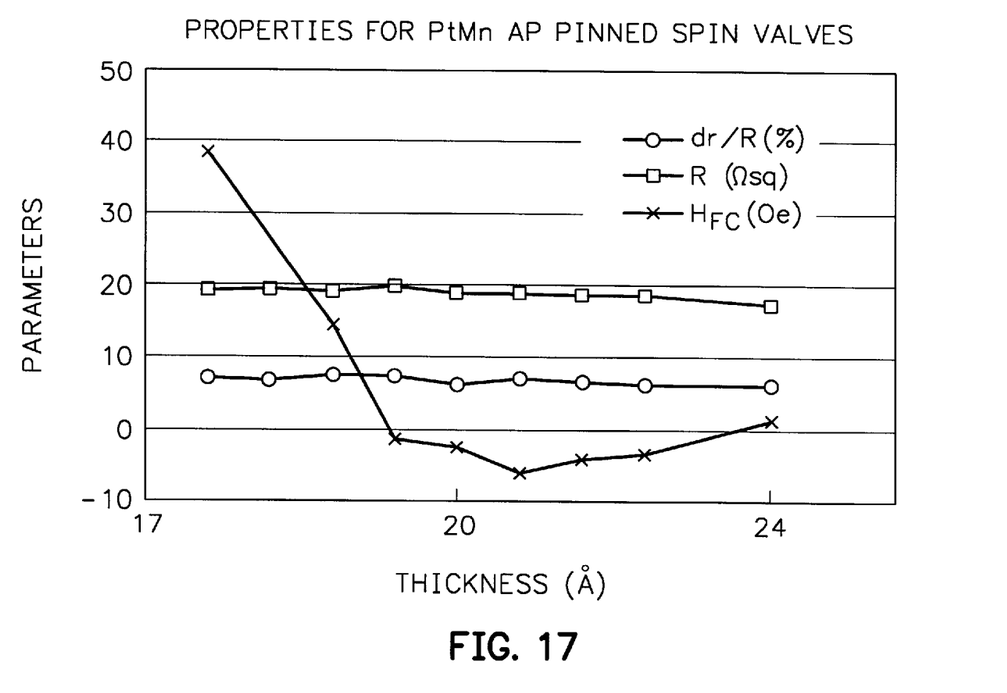
FIG. 17 is a graph showing various parameters for various thicknesses of a copper spacer layer of the spin valve sensor shown in FIG. 17.

An embodiment 600 of the present invention is illustrated in FIGS. 14 and 15, wherein a ferromagnetic coupling field $H_{FC}$ is negative instead of positive, which will be discussed in more detail hereinafter. The read head 600 includes a spin valve sensor 602 which is located between first and second gap layers (G1 and G2) 604 and 606 and the first and second gap layers 604 and 606 are located between first and second shield layers (S1 and S2) 608 and 610. The spin valve sensor 602 includes a nonmagnetic electrically conductive spacer layer 612 which is located between an AP pinned layer structure 614 and a free layer structure 616. The AP pinned layer structure 614 has an antiparallel coupling layer 618 which is located between a ferromagnetic first AP pinned layer (AP1) 620 and a ferromagnetic second AP pinned layer (AP2) 622. The first AP pinned layer 620 is exchange coupled to an antiferromagnetic (AFM) pinning layer 624 so that a magnetic moment 626 of the first AP pinned layer is pinned perpendicular to the ABS such as away from the ABS as shown in FIG. 17. By a strong antiparallel coupling between the first and second AP pinned layers the second AP pinned layer has a magnetic moment 628 which is antiparallel to the magnetic moment 626. The second AP pinned layer 622 is thicker than the first AP pinned layer 620 so that a net demag $H_D$ from the AP pinned layer structure 614 on the free layer structure 616 will be antiparallel to the magnetic moment 628. The magnetic moments 626 and 628 of the first and second AP pinned layers may be set by directing a magnetic field of 12 K Oe away from the spin valve sensor in the direction of the magnetic moment 216 for a period of 5 hours in the presence of heat at a temperature of 240° C. This may be accomplished after constructing the spin valve sensor or after constructing the read head.

A first seed layer (SL1) 630 is located on the first gap layer 604, a second seed layer (SL2) 632 is located on the first seed layer 630 and a third seed layer (SL3) 634 is located on the second seed layer 632. These seed layers, which influence the microstructures of subsequent spin valve sensor layers formed thereon, in combination with a predetermined thickness of the spacer layer 612, establish the negative ferromagnetic coupling field $-H_{FC}$, which will be discussed in more detail hereinafter.

The free layer structure 616 includes a ferromagnetic free layer (F) 636 and a ferromagnetic nanolayer (NL) 638. The free layer structure 616 has a magnetic moment 640 which is parallel to the ABS when there is readback symmetry and this direction can be to the left, or to the right as shown in FIG. 14. A cap layer 642 may be on the free layer structure 616 for protecting it from subsequent processing steps. When a signal field rotates the magnetic moment 640 upwardly it becomes more antiparallel to the magnetic moment 628 which increases the resistance of the spin valve sensor and when a signal field rotates the magnetic moment 640 downwardly it becomes more parallel to the magnetic moment 628 which decreases the resistance of the head. When the sense current $I_S$ is conducted through the spin valve sensor these changes in resistance causes potential changes in the processing circuitry 50 in FIG. 3 which are processed as playback signals.

The sense current $I_S$ is oriented in a direction which causes a sense current field from the free layer structure 616 on the first AP pinned layer 210 which is oriented in a direction which is antiparallel to the magnetic moment 628. Another way of stating the direction of the sense current $I_S$ is that a sense current field from all of the metallic layers other than the free layer structure 616 exerted on the free layer structure is opposite to the net demagnetization field $H_D$. The sense current $I_S$ causes image currents in the first and second shield layers 608 and 610 which exert imaging fields on the free layer structure 616. Since the free layer structure is closer to the second shield layer 610 there is a net imaging current field $H_{IM}$ which is directed upwardly into the free layer structure 616.

The first read gap is larger than the second read gap which causes a net image current field $H_{IM}$ to be directed upwardly into the free layer structure as shown in FIG. 15. Since the magnetic moment 628 is greater than the magnetic moment 626 there is a net demagnetization field $H_D$ on the free layer structure which is directed upwardly into the head. Since the ferromagnetic coupling field is a negative ferromagnetic coupling field $-H_{FC}$ it is directed antiparallel to the magnetic moment 628 into the free layer structure as shown in FIG. 15. The sense current $I_S$ now causes a sense current field $H_I$ on the free layer structure 616 which opposes the negative ferromagnetic coupling field $-H_{FC}$ the net demagnetization field $H_D$ and the image current field $H_{IM}$ on the free layer structure.

Preferred thicknesses for the first and second gap layers 604 and 606 are 200 Å of aluminum oxide ($Al_2O_3$) for the first gap layer 604 and 200 Å of aluminum oxide ($Al_2O_3$) for the second gap layer 606. Preferred thicknesses and materials for the spin valve sensor 602 are 30 Å of aluminum oxide ($Al_2O_3$) for the first seed layer 630, 30 Å of nickel manganese oxide (NiMnO) for the second seed layer 632, 35 Å of tantalum (Ta) for the third seed layer 634, 200 Å of platinum manganese (PtMn) for the pinning layer 624, 17 Å of cobalt iron (CoFe) for the first AP pinned layer 620, 8 Å of ruthenium (Ru) for the antiparallel coupling layer 618, 26 Å of cobalt iron (CoFe) for the second AP pinned layer 622, 21 Å of copper (Cu) for the spacer layer 612, 1.5 Å of cobalt iron (CoFe) for the nanolayer 638, 30 Å of nickel iron (NiFe) for the free layer 636 and 50 Å of tantalum (Ta) for the cap layer 642.

Figure 16:
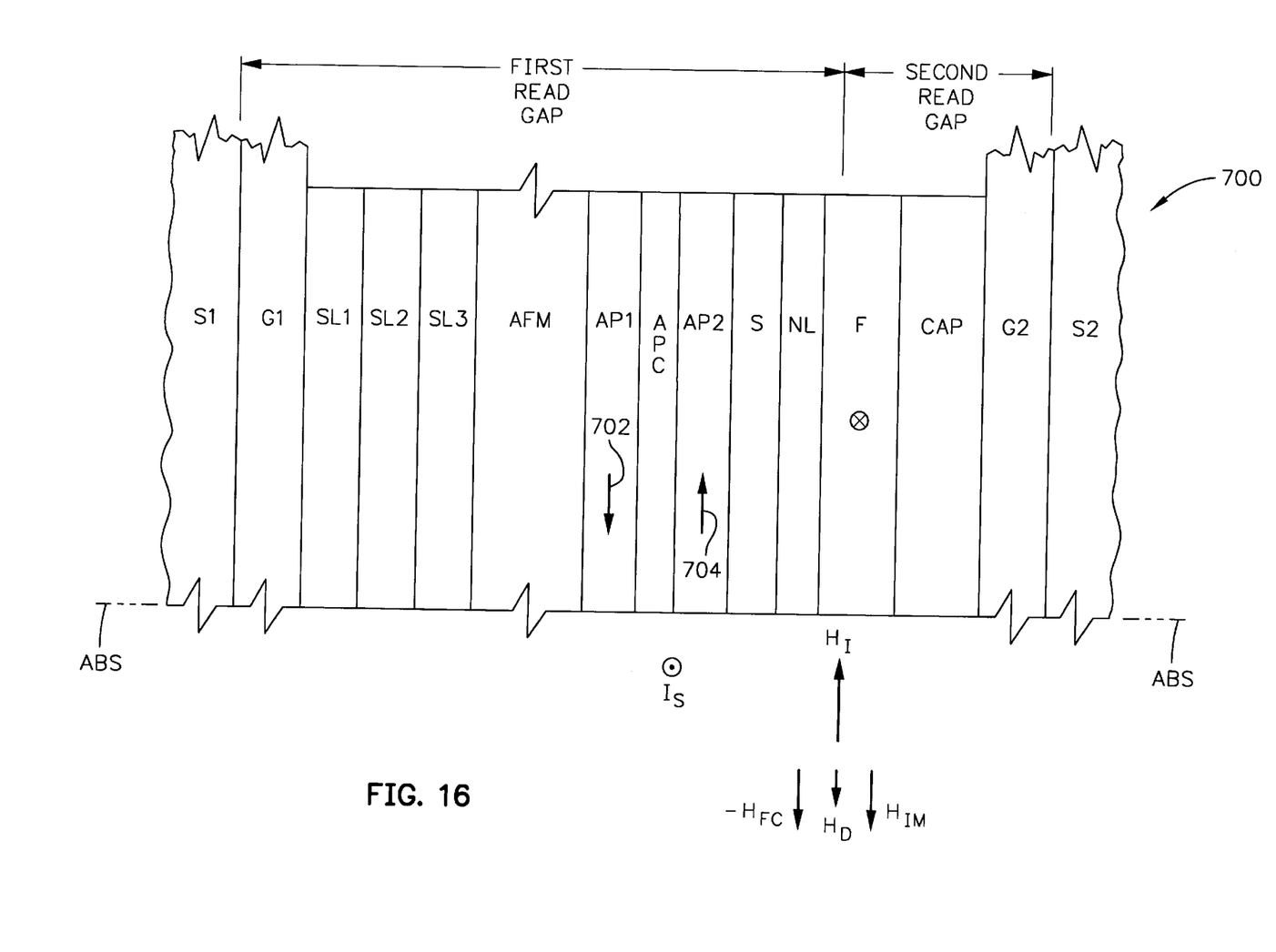
FIG. 16 is the same as FIG. 15 except the directions of the sense current $I_S$ and the magnetic moments of the first and second AP pinned layers (AP1 and AP2) are reversed.

The read head 700 in FIG. 16 is the same as the read head in FIGS. 14 and 15 except the directions of the sense current $I_S$ and magnetic moments 702 and 704 of the first and second AP pinned layers have been reversed. With this arrangement the sense current field $H_I$ exerted on the free layer structure 616 is directed into the head and opposes the negative ferromagnetic coupling field $-H_{FC}$, the net demagnetization field $H_D$ and the image current field $H_{IM}$. The orientation of the magnetic moment 640 of the free layer structure can be into the head as shown or out of the head.

Platinum manganese (PtMn) is preferably employed for the pinning layer 624. The blocking temperature of platinum manganese (PtMn) is 330° C. to 350° C. wherein the blocking temperature is the temperature at which the magnetic spins of the pinning layer are free to rotate in response to a magnetic field. A high blocking temperature is important since the sense current field from the free layer structure 616 opposes the magnetic moment 628 of the second AP pinned layer. This means that the sense current field from the free layer structure 616 opposes the pinning between the pinning layer 624 and the first AP pinned layer 626. Accordingly, the platinum manganese (PtMn) of the pinning layer 624 makes the read head thermally stable during construction of the read head or after its installation on a magnetic disk drive in spite of the fact that the sense current field from the free layer structure 616 opposes the pinning of the first AP pinned layer 620 by the pinning layer 624. It should be understood that when an electrostatic discharge (ESD) raises the temperature of the spin valve sensor at or above the blocking temperature of the pinning layer 624 the magnetic moment of the first and second AP pinned layers 620 and 622 are free to rotate in response to a magnetic field such as a signal field from the rotating magnetic disk. Further, in a magnetic disk drive the slider carrying the magnetic head may contact an asperity which raises the temperature of the spin valve sensor above the blocking temperature of the pinning layer which can cause the magnetic moment of the second AP pinned layer 622 to become disoriented in the presence of a magnetic field. If the blocking temperature of the pinning layer 624 is high enough these occurrences will not occur.

The first read gap may be twice the second read gap, however, in a preferred embodiment the first read gap is one and one-half times the second read gap. This arrangement would be reversed, however, in a top spin valve wherein the order of the layers of the spin valve sensor are reversed. After formation of the first gap layer 604 in a top spin valve the free layer 636 is formed on the first gap layer, the nanolayer 638 is formed on the free layer 636, the spacer layer 612 is formed on the nanolayer, the second AP pinned layer 622 is formed on the spacer layer, the antiparallel coupling layer 618 is formed on the second AP pinned layer, the first AP pinned layer 620 is formed on the AP coupling layer, the pinning layer 624 is formed on the first AP pinned layer 620, the cap layer 642 is formed on the pinning layer 624 and the second gap layer 606 is formed on the cap layer. In the top spin valve arrangement the second read gap is larger than the first read gap so that the net imaging field $H_{IM}$ comes from the first shield layer 608 instead of from the second shield layer 610. In the top spin valve the magnetic moments of the first and second AP pinned layers 620 and 622 and the sense current $I_S$ are oriented in directions so that the sense current field $H_I$ still opposes the negative ferromagnetic coupling field $H_{FC}$, the net demagnetization field $H_D$ and the image current field $H_{IM}$.

Exemplary fields acting on the free layer structure 616 in FIGS. 14 and 15 are 20 Oe for the sense current field $H_I$, 10 Oe for the negative ferromagnetic coupling field $H_{FC}$, 5 Oe for the net demagnetization field $H_D$ and 10 Oe for the imaging current field $H_{IM}$. This would cause a net field acting on the free layer structure 616 of about 5 Oe. Each oersted causes about one degree of asymmetry which means that for the values given the read head would have five degrees of asymmetry. Since the net field would rotate the magnetic moment 640 of the free layer structure slightly upwardly toward a more antiparallel position relative to the magnetic moment 628 of the second AP pinned layer the resistance of the spin valve sensor increases which would cause the bias point 500 in FIG. 15 to be located above its present position on the transfer curve 502. In this instance the magnetic head is negatively biased and the negative portion of the readback signal 506 will be greater than the positive portion thereof. Readback asymmetry on the order of five degrees is acceptable in the trade, however, in the present invention the thicknesses of the layers and their arrangement can be adjusted so that the sense current field $H_I$ completely counterbalances the negative ferromagnetic coupling field $H_{FC}$, the demagnetization field $H_D$ and the imaging current field $H_{IM}$.

The read head 600 in FIGS. 14 and 15 was evaluated for various parameters which are shown in the chart in FIG. 17. The abscissa shows variations in the thickness of the copper spacer layer 612 and the ordinate shows the various parameters which are ferromagnetic coupling field $H_{FC}$, resistance R of the sensor and magnetoresistive coefficient dr/R. It can be seen that when the thickness of the spacer layer 612 is in the range of approximately 19 Å to 24 Å that the ferromagnetic coupling field $H_{FC}$ is negative and that for other thicknesses the ferromagnetic coupling field $H_{FC}$ is positive. When the thickness of the spacer layer 612 is 21 Å, as shown in the preferred embodiment in FIGS. 14 and 15, the negative ferromagnetic coupling field $-H_{FC}$ is at a maximum of approximately −5 Oe. It should be noted that when the first seed layer 630 is omitted in the spin valve sensor 602 in FIG. 14 and the second seed layer 632 is directly on and interfaces the first gap layer 604 that the negative ferromagnetic coupling field $-H_{FC}$ will be about the same as when the first seed layer 630 is employed.

Clearly, other embodiments and modifications of this invention will occur readily to those of ordinary skill in the art in view of these teachings. For instance, instead of the second AP pinned layer 622 having a thickness or magnetic moment greater than the first AP pinned layer 620 the second AP pinned layer 622 may have a thickness or magnetic moment less than the first AP pinned layer 620. In such an embodiment $H_I = H_D + H_{FC} + H_{IM}$. Further, a negative ferromagnetic coupling field $-H_{FC}$ may be obtained with a pinning layer 624 other than platinum manganese (PtMn) such as iridium manganese (IrMn), nickel manganese (NiMn) or nickel oxide (NiO). Therefore, this invention is to be limited only by the following claims, which include all such embodiments and modifications when viewed in conjunction with the above specification and accompanying drawings.

We claim:

1. A magnetic read head that has an air bearing surface (ABS), comprising:
   nonmagnetic nonconductive first and second read gap layers;
   a spin valve sensor located between the first and second read gap layers;
   ferromagnetic first and second shield layers;
   the first and second read gap layers being located between the first and second shield layers with the first read gap layer interfacirig the first shield layer and the second read gap layer interfacing the second shield layer;
   the spin valve sensor including:
      a free layer structure that has a magnetic moment;
      a ferromagnetic antiparallel (AP) pinned layer structure with a net magnetic moment that produces a net demagnetization field $H_D$ through the free layer structure in a direction perpendicular to the ABS;
      a pinning layer exchange coupled to the AP pinned layer structure for pinning the net magnetic moment of the AP pinned layer structure; and
      a nonmagnetic conductive spacer layer located between the free layer structure and the AP pinned layer structure;
   the AP pinned layer structure including:
      ferromagnetic first and second antiparallel (AP) pinned layers with the first AP pinned layer interfacing the pinning layer and the second AP pinned layer interfacing the spacer layer;
      an antiparallel (AP) coupling layer located between and interfacing the first and second AP pinned layers; and
      the second AP pinned layer having a magnetic moment that exerts a negative ferromagnetic coupling field $H_{FC}$ on the free layer structure in a direction perpendicular to the ABS;
   a first read gap distance between the first shield layer and a middle of the free layer structure and a second read gap distance between the second shield layer and the middle of the free layer structure wherein one of the first and second read gap distances is greater than the other of the first and second read gap distances so that a net image current field $H_{IM}$ can be exerted on the free layer structure by the first and second shield layers; and
   a sense current source for conducting a sense current in a predetermined direction through the sensor for exerting a sense current field $H_I$ and said net image current field $H_{IM}$ on the free layer structure in a direction perpendicular to the ABS with the sense current field $H_I$ antiparallel to the ferromagnetic coupling field $H_{FC}$ and the net image current field $H_{IM}$.

2. A magnetic read head as claimed in claim 1 wherein the sense current source causes a sense current field from the free layer structure that opposes the net demagnetization field $H_D$.

3. A magnetic read head as claimed in claim 1 wherein the first read gap distance is greater than the second read gap distance and the pinning layer is located between the free layer structure and the first read gap layer.

4. A magnetic read head as claimed in claim 3 wherein the sense current source causes a sense current field from the free layer structure that opposes the net demagnetization field $H_D$.

5. A magnetic read head as claimed in claim 1 wherein the pinning layer is platinum manganese (PtMn) and $H_I=H_D+H_{FC}+H_{IM}$ where $H_D$ equals the net demagnetization field exerted on the free layer structure.

6. A magnetic head assembly comprising:
   a write head including:
      ferromagnetic first and second pole piece layers that each have a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions; and
   a read head that has an air bearing surface (ABS), the read head including:
      nonmagnetic nonconductive first and second read gap layers;
      a spin valve sensor located between the first and second read gap layers;
      a ferromagnetic first shield layer; and
      the first and second read gap layers being located between the first shield layer and the first pole piece layer with the first read gap layer interfacing the first shield layer;
   the spin valve sensor including:
      a free layer structure that has a magnetic moment;
      a ferromagnetic antiparallel (AP) pinned layer structure with a net magnetic moment that produces a net demagnetization field $H_D$ through the free layer structure in a direction perpendicular to the ABS;
      a pinning layer exchange coupled to the AP pinned layer structure for pinning the net magnetic moment of the AP pinned layer structure; and
      a nonmagnetic conductive spacer layer located between the free layer structure and the AP pinned layer structure;
   the AP pinned layer structure including:
      ferromagnetic first and second antiparallel (AP) pinned layers with the first AP pinned layer interfacing the pinning layer and the second AP pinned layer interfacing the spacer layer;
      an antiparallel (AP) coupling layer located between and interfacing the first and second AP pinned layers; and
      the second AP pinned layer having a magnetic moment that exerts a negative ferromagnetic coupling field $H_{FC}$ on the free layer structure in a direction perpendicular to the ABS;
   a first read gap distance between the first shield layer and a middle of the free layer structure and a second read gap distance between the second shield layer and the middle of the free layer structure wherein one of the first and second read gap distances is greater than the other of the first and second read gap distances so that a net image current field $H_{IM}$ can be exerted on the free layer structure by the first and second shield layers; and
   a sense current source for conducting a sense current in a predetermined direction through the sensor for exerting a sense current field $H_I$ and said net image current field $H_{IM}$ on the free layer structure in a direction perpendicular to the ABS with the sense current field $H_I$ antiparallel to the ferromagnetic coupling field $H_{FC}$ and the net image current field $H_{IM}$.

7. A magnetic head assembly as claimed in claim 6 including:

a ferromagnetic second shield layer;

a nonmagnetic isolation layer located between the second shield layer and the first pole piece layer.

8. A magnetic head assembly as claimed in claim 6 wherein the sense current source causes a sense current field from the free layer structure that opposes the net demagnetization field $H_D$.

9. A magnetic head assembly as claimed in claim 6 wherein the first read gap distance is greater than the second read gap distance and the pinning layer is located between the free layer structure and the first read gap layer.

10. A magnetic head assembly as claimed in claim 9 wherein the sense current source causes a sense current field from the free layer structure that opposes the net demagnetization field $H_D$.

11. A magnetic head assembly as claimed in claim 6 wherein the pinning layer is platinum manganese (PtMn) and $H_I=H_D+H_{FC}+H_{IM}$ where $H_D$ equals the net demagnetization field exerted on the free layer structure.

12. A magnetic disk drive comprising:
- a write head including:
  - ferromagnetic first and second pole piece layers that each have a yoke portion located between a pole tip portion and a back gap portion;
  - a nonmagnetic write gap layer located between the pole tip portions of the first and second pole piece layers;
  - an insulation stack with at least one coil layer embedded therein located between the yoke portions of the first and second pole piece layers; and
  - the first and second pole piece layers being connected at their back gap portions; and
- a read head that has an air bearing surface (ABS), the read head including:
  - nonmagnetic nonconductive first and second read gap layers;
  - a spin valve sensor located between the first and second read gap layers;
  - a ferromagnetic first shield layer;
  - the first and second read gap layers being located between the first shield layer and the first pole piece layer with the first read gap layer interfacing the first shield layer;
- the spin valve sensor including:
  - a free layer structure that has a magnetic moment;
  - a ferromagnetic antiparallel (AP) pinned layer structure with a net magnetic moment that produces a net demagnetization field $H_D$ through the free layer structure in a direction perpendicular to the ABS;
  - a pinning layer exchange coupled to the AP pinned layer structure for pinning the net magnetic moment of the AP pinned layer structure; and
  - a nonmagnetic conductive spacer layer located between the free layer structure and the AP pinned layer structure;
- the AP pinned layer structure including:
  - ferromagnetic first and second antiparallel (AP) pinned layers with the first AP pinned layer interfacing the pinning layer and the second AP pinned layer interfacing the spacer layer;
  - an antiparallel (AP) coupling layer located between and interfacing the first and second AP pinned layers; and
  - the second AP pinned layer having a magnetic moment that exerts a negative ferromagnetic field $H_{FC}$ on the free layer structure in a direction perpendicular to the ABS;
- a first read gap distance between the first shield layer and a middle of the free layer structure and a second read gap distance between the second shield layer and the middle of the free layer structure wherein one of the first and second read gap distances is greater than the other of the first and second read gap distances so that a net image current field $H_{IM}$ can be exerted on the free layer structure by the first and second shield layers;
- a housing;
- a magnetic disk rotatably supported in the housing;
- a support mounted in the housing for supporting the magnetic head assembly with said ABS facing the magnetic disk so that the magnetic head assembly is in a transducing relationship with the magnetic disk;
- a spindle motor for rotating the magnetic disk;
- an actuator positioning means connected to the support for moving the magnetic head to multiple positions with respect to said magnetic disk; and
- a processor connected to the magnetic head, to the spindle motor and to the actuator for exchanging signals with the magnetic head, for controlling movement of the magnetic disk and for controlling the position of the magnetic head; and
- the processor including a sense current source for conducting a sense current in a predetermined direction through the sensor for exerting a sense current field $H_I$ and said net image sense current field $H_{IM}$ on the free layer structure in a direction perpendicular to the ABS with the sense current field $H_I$ antiparallel to the ferromagnetic coupling field $H_{FC}$ and the net image current field $H_{IM}$.

13. A magnetic disk drive as claimed in claim 12 including:

a ferromagnetic second shield layer;

a nonmagnetic isolation layer located between the second shield layer and the first pole piece layer.

14. A magnetic disk drive as claimed in claim 12 wherein the sense current source causes a sense current field from the free layer structure that opposes the net demagnetization field $H_D$.

15. A magnetic disk drive as claimed in claim 12 wherein the first read gap distance is greater than the second read gap distance and the pinning layer is located between the free layer structure and the first read gap layer.

16. A magnetic disk drive as claimed in claim 15 wherein the sense current source causes a sense current field from the free layer structure that opposes the net demagnetization field $H_D$.

17. A magnetic disk drive as claimed in claim 12 wherein the pinning layer is platinum manganese (PtMn) and $H_I=H_D+H_{FC}+H_{IM}$ where $H_D$ equals the net demagnetization field exerted on the free layer structure.

* * * * *